(12) United States Patent
Kalkunte et al.

(10) Patent No.: US 7,606,161 B2
(45) Date of Patent: Oct. 20, 2009

(54) DISTRIBUTING INFORMATION ACROSS EQUAL-COST PATHS IN A NETWORK

(75) Inventors: Mohan Kalkunte, Sunnyvale, CA (US); Srinivas Sampath, Sunnyvale, CA (US); Karagada Ramarao Kishore, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 783 days.

(21) Appl. No.: 10/825,656

(22) Filed: Apr. 16, 2004

(65) Prior Publication Data

US 2004/0264380 A1  Dec. 30, 2004

Related U.S. Application Data

(60) Provisional application No. 60/483,026, filed on Jun. 27, 2003, provisional application No. 60/529,617, filed on Dec. 16, 2003.

(51) Int. Cl.
*G01R 31/08* (2006.01)

(52) U.S. Cl. .................... 370/238.1; 370/351

(58) Field of Classification Search ............... 370/392, 370/237, 238, 389, 401, 230, 230.1, 235.1, 370/238.1, 351, 395.3, 395.31, 395.32, 395.4, 370/395.41, 395.42; 726/26; 714/9; 709/238–244; 711/216–221

See application file for complete search history.

(56) References Cited

U.S. PATENT DOCUMENTS

| | | | |
|---|---|---|---|
| 6,574,669 B1 * | 6/2003 | Weaver | 709/239 |
| 6,643,287 B1 * | 11/2003 | Callon et al. | 370/392 |
| 7,123,620 B1 * | 10/2006 | Ma | 370/395.32 |
| 7,243,258 B2 * | 7/2007 | Ichinohe et al. | 714/9 |
| 2004/0064583 A1 * | 4/2004 | Dani et al. | 709/241 |

OTHER PUBLICATIONS

C. Hopps (RFC 2992, Analysis of an Equal-Cost Multi-Path Algorithm, Nov. 2000, http://rfc.dotsrc.org/rfc/rfc2992.html).*

* cited by examiner

*Primary Examiner*—Gregory B Sefcheck
*Assistant Examiner*—Nima Mahmoudzadeh (57) ABSTRACT

A method of distributing data across a network having a plurality of equal-cost paths. Also, a device for distributing data over a network according to the method. The data, which is typically contained in data packets, may be distributed based on at least one attribute of each of the packets. The data may also be distributed according to a weighted distribution function that allows for unequal amounts of traffic to be distributed to each of the equal-cost paths.

13 Claims, 9 Drawing Sheets

DISTRIBUTING INFORMATION ACROSS EQUAL-COST PATHS IN A NETWORK

CROSS REFERENCE TO RELATED APPLICATIONS

This application claims priority from U.S. Provisional Patent Application Ser. No. 60/483,026, entitled "ECMP IN XGS" and filed on Jun. 27, 2003 and U.S. Provisional Patent Application Ser. No. 60/592,617, entitled "Distributing Information Across Equal-Cost Paths in a Network" and filed on Dec. 16, 2003. The contents of the provisional applications are hereby incorporated in their entirety by reference.

BACKGROUND OF THE INVENTION

1. Field of the Invention

Certain embodiments of the present invention are directed to methods of distributing datagrams across a network. Certain other embodiments of the present invention are directed to devices for implementing such methods.

2. Description of the Related Art

Telecommunications systems typically distribute information, usually in the form of datagrams such as, but not limited to, data cells and packets, over networks that include network devices such as, but not limited to, hosts, servers, modules, nodes, and distribution devices such as, but not limited to, switches and routers. A small portion of a representative network is illustrated in FIG. 1.

Figure 1:
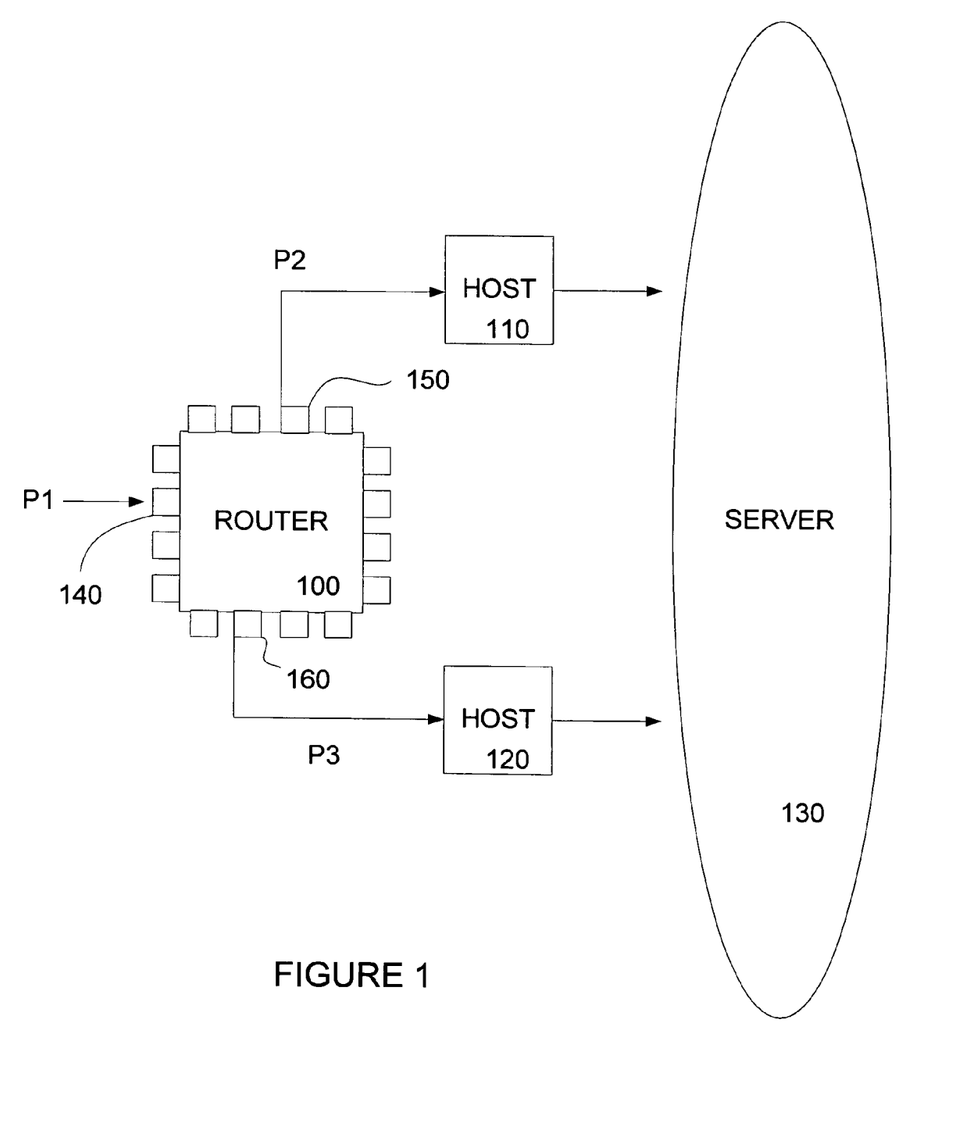
FIG. 1 illustrates two equal-cost paths for a first packet between a router and a server.

In FIG. 1, a switch or router 100, a first host 110, a second host 120, and a server 130 are all illustrated as being connected/linked to each other and to thereby form a portion of a network. The router 100 includes a plurality of ports. Among the plurality of ports, a first port 140 functions as an ingress port for a first datagram, illustrated as a first packet P1 in FIG. 1. The first packet P1 has been forwarded to the router 100 from a source that is not illustrated in FIG. 1.

A second port 150, also among the plurality of ports, is one possible egress for the data that came into the router 100 as part of the first packet P1. In a Layer-3 switching environment, upon egress from the router 100, the source address (SA) of the packet is changed to the router MAC address of the router 100. The destination address (DA) of the packet is changed to the next-hop address (NHA) or, in the example illustrated in FIG. 1, the address of the first host 110. The data egresses in the form of a second packet P2 from the router 100 to the first host 110.

A third port 160 is another potential egress port for the data that entered the router 100 through the first port 140. If the data egresses through the third port 160, it does so as a third datagram, illustrated as a third packet P3 in FIG. 1. The third packet P3 has a different SA than the first packet P1 and a different DA, or NHA, than the second packet P2, since the third packet's P3 next hop is to the second host 120 while the second packet's P2 next hop is to the first host 110. It should also be noted that other packet attributes, such as time-to-live (TTL) and Header Checksum typically change. It should also be noted that, in FIG. 1, the SA of the second packet P2 and third packet P3 will be the same, but different than the SA of the first packet P1.

Although many other factors frequently come into play, according to a simplified model, calculating the "cost" of a path in a network involves counting the number of "hops" that a datagram or packet has to make between a source and a destination. For example, in FIG. 1, an IP packet traveling from the router 100 to the server 130 may hop to either the first host 110 or second host 120 before hopping to the server 130. Since the number of hops are equivalent for the IP packet, regardless of whether it travels to the first host 110 or second host 120, the IP packet at the router 100 is said to have two equal-cost paths available to it.

According to this simplified model, since the router 100 relies exclusively upon the number of hops between it and the datagram or packet destination to determine the cost of a path, the router 100 can make no cost-based distinction between the path through the first host 110 and the path through the second host 120. Hence, in order to determine whether to forward the data in the first packet P1 as the second packet P2 or the third packet P3, the router 100 often makes use of an equal-cost multi-path (ECMP) algorithm, which is well know in the related art.

Unfortunately, although ECMP algorithms according to the related art are often useful for distributing traffic evenly over a set of equal-cost paths, ECMP algorithms according to the related art fail to account for general network traffic that also commonly flows through the various network devices along the equal-cost paths. Hence, in the partial network illustrated in FIG. 1, if the first host 110 has more general network traffic flowing across it than the second host 120, when the router 100 begins distributing packet traffic via the ECMP algorithm discussed above, then the first host 110 could become overly burdened with total traffic relative to the second host 120. Under such circumstances, the network devices are generally not utilized optimally and the network is not operating at maximum efficiency.

In addition to the general inability of ECMP algorithms according to the related art to account for general network traffic, these algorithms also typically require a considerable amount of distribution device resources. These resources are generally in the form of time allocated to performing the algorithms and in the form of hardware that is used and re-used while performing the algorithms.

At least in view of the above, there is a need for methods that are capable of distributing datagram, data, and/or packet traffic across equal-cost paths in a network in a manner that reduces the possibility that certain network devices along the equal-cost paths will be overly burdened. There is also a need for devices capable of implementing such methods.

In addition, at least in view of the above, there is also a need for methods that reduce the amount of time spent by the distribution device in performing lookup algorithms and/or that reduce the amount of hardware that is used and re-used while performing such algorithms. Further, there is a need for devices capable of implementing such methods.

SUMMARY OF THE INVENTION

In order to address and/or overcome at least some of the above-discussed shortcomings of the related art, new devices and methods are provided. Some of these methods and devices are summarized below.

According to certain embodiments of the present invention, a first method of distributing data across a network is provided. According to this first method, a step of providing a distribution device configured to distribute packets of data across a set of equal-cost paths in a network is typically provided. According to this first method, distribution of the packets across the paths is usually based on at least one attribute of each of the packets.

According to certain other embodiments of the present invention, a second method of distributing data across the network is provided. According to this second method, a distribution device is normally provided, and this distribution device is generally configured to distribute a set of packets of data across a set of equal-cost paths in the network. According to this second method, each packet in the set of packets is typically distributed across the set of equal-cost paths according to a weighted distribution.

According to yet other embodiments of the present invention, a first data packet distribution device is provided. This distribution device typically includes a set of ports and a first distribution unit. The first distribution unit often includes a device logic. Usually, the first distribution unit is configured to use the device logic to distribute a packet of data entering the device through a first port among the set of ports to a second port among the set of ports. Normally, the device logic includes a first lookup unit that itself generally includes an acknowledgement unit for acknowledging whether multiple equal-cost paths exist, a first referencing unit for referencing a second lookup unit when multiple equal-cost paths do exist, and a second referencing unit for referencing a third lookup unit otherwise. Typically, the device logic also includes the second lookup unit that itself includes a second distribution unit for distributing the packet across the set of ports and a third referencing unit for referencing the third lookup unit. Also, the device logic commonly includes the third lookup unit, that itself usually includes a selection unit for selecting the second port.

In addition, certain embodiments of the present invention include a second device for distributing Internet Protocol (IP) packets across a network. The device generally includes a set of interface means for interfacing the device with the network. The device also routinely includes distribution means for distributing a set of IP packets entering the device through a first interface means in the set of interface means such that packets in the set of IP packets are distributed across all of the interface means in the set of interface means that are operably connected to equal-cost paths according to a weighted distribution.

BRIEF DESCRIPTION OF THE DRAWINGS

For proper understanding of certain embodiments of the invention, reference should be made to the accompanying drawings, wherein.

DETAILED DESCRIPTION OF THE PREFERRED EMBODIMENTS

As telecommunications networks grow and increase in speed, more and more information and/or data is distributed over the networks, often in the form of datagrams. Hence, it becomes more and more desirable to enhance network efficiency at every level. Below are described several representative methods and devices for enhancing network efficiency by more efficiently distributing datagrams such as, but not limited to, Internet Protocol (IP) packets, over a network.

According to certain embodiments of the present invention, distribution and/or routing methods for distributing datagrams, often in the form of IP packets, across a network are provided. These methods typically help alleviate traffic congestion across network devices and/or entire portions of the network. The network devices may include, for example, nodes, modules, routers, distribution devices, and links, In order to illustrate how some of these methods operate, the representative packet 200 and the representative set of tables 210, 220, 230 illustrated in FIG. 2 will frequently be referenced. One skilled in the art of the present invention will recognize that the tables shown in FIG. 2 may be thought of as collections or compilations of sets of instructions and that each entry in each of the tables may be thought of as a set of instructions. One skilled in the art will also recognize that the packet 200 is only a representative datagram and that datagrams having attributes other than the source IP (SIP) address and destination IP (DIP) address illustrated in FIG. 2 may also be used according to certain embodiments of the present invention. One skilled in the art will further recognize that no particular restrictions are made on the type or form of the DATA that is included in each packet 200.

Figure 3:
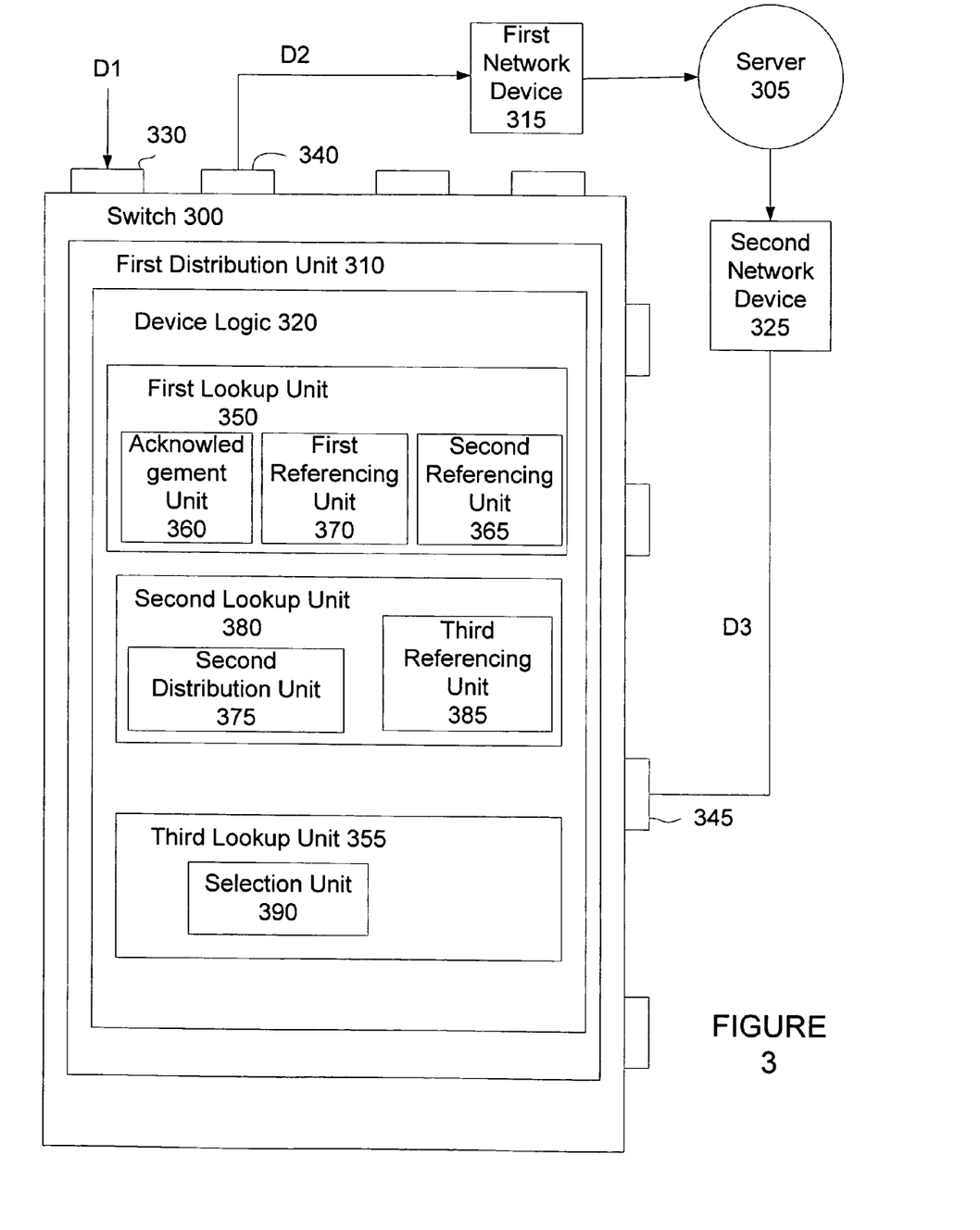
FIG. 3 illustrates a distribution device according to certain embodiments of the present invention, along with a pair of equal-cost paths between the distribution device and a server.

As mentioned above, according to certain embodiments of the present invention, methods of distributing data across a network are provided. According to some of these methods, such as the first representative method 400 illustrated in FIG. 4, a distribution device, such as, for example, the switch 300 illustrated in FIG. 3, is provided in a network according to a first step 410. Generally, multiple equal-cost paths exist between the distribution device and a destination to which multiple datagrams or packets are to be forwarded over time. Hence, also according to this first step 410, the distribution device is typically configured to distribute the datagrams across the set of equal-cost paths. Preferably, the distribution is made in a manner that can avoid overburdening certain network devices, especially when other network devices that are less encumbered by network traffic are available. In FIG. 3, a representative destination is illustrated as the server 305, and two representative network devices are illustrated as a first network device 315 and a second network device 325.

Figure 4:
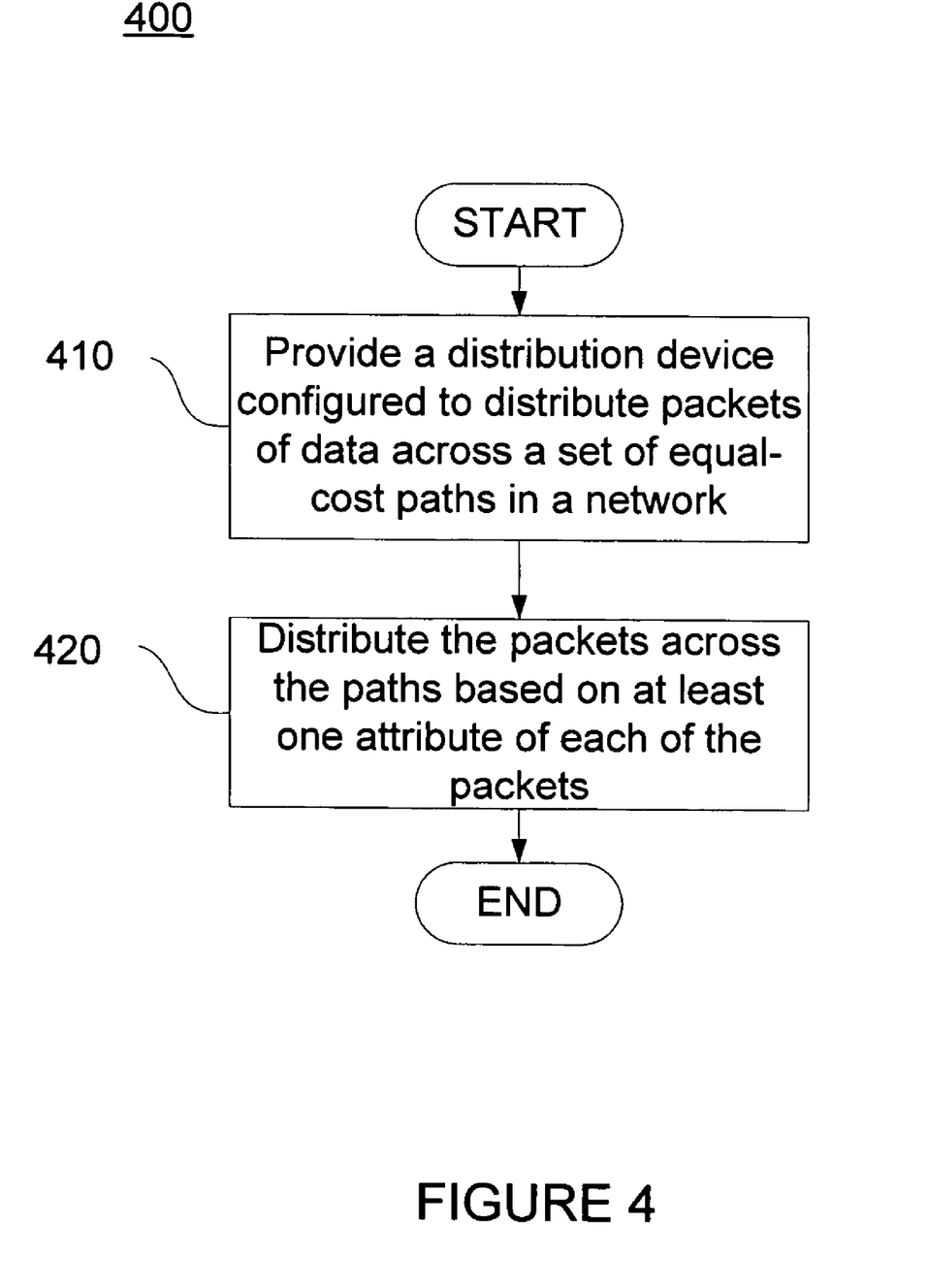
FIG. 4 illustrates the steps of a first representative algorithm that may be used, according to certain embodiments of the present invention, for distributing data across a network.

According to certain embodiments of the present invention, as shown in the second step 420 of the first representative method 400, the datagrams are distributed, over time, across each of the available equal-cost paths. In this second step the distribution is made as a function of at least one attribute of each of the datagrams.

Figure 5:
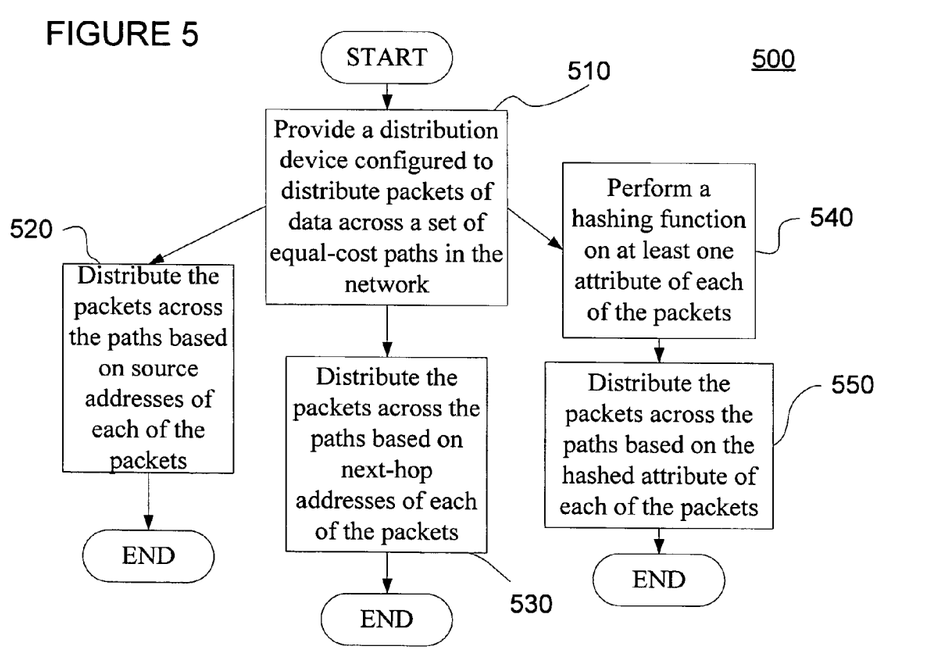
FIG. 5 illustrates the steps of a second representative algorithm that may be used, according to certain embodiments of the present invention, for distributing data across a network.

According to a second representative method 500, the steps of which are illustrated in FIG. 5, a distribution device configured to distribute packets of data across a set of equal-cost paths in the network is provided according to a first step 510. Typically, when choosing over which of the set of equal-cost paths a given packet is to be distributed, the choice is made based, at least partially, on a packet attribute. For example, according to the second step 520 illustrated in FIG. 5, the attribute may be the SIP. The attribute may also be the DIP, as shown in the third step 530, and so on.

Another representative embodiment of the present invention that illustrates how the packet attribute is used to choose from among a set of equal-cost paths is discussed below, and is explained with reference to the exemplary packet 200 and tables 210, 220, 230 illustrated in FIG. 2. According to this embodiment, the packet 200 may be thought of as a more detailed view or version of a first datagram D1 that enters a distribution device, such as the switch 300 illustrated in FIG. 3, through an ingress port, such as the first port 330 or another interface means.

The distribution device typically includes, or is operably connected to, a first distribution unit 310 that itself typically includes a device logic 320 and/or memory. Usually, the first distribution unit 310 is configured to make use of the device logic 320 and/or memory when distributing DATA contained in the first datagram D1 that enters the distribution device. The first datagram D1 typically enters through the first port 330 and is distributed to an egress port, such as a second port 340 or a third port 345, chosen from among a plurality of possible egress ports. If the second port 340 illustrated in FIG. 3 is chosen, the second datagram D2 illustrated egresses from the switch 300 and, if the third port 345 is chosen, the third datagram D3 egresses from the switch 300.

Figure 2:
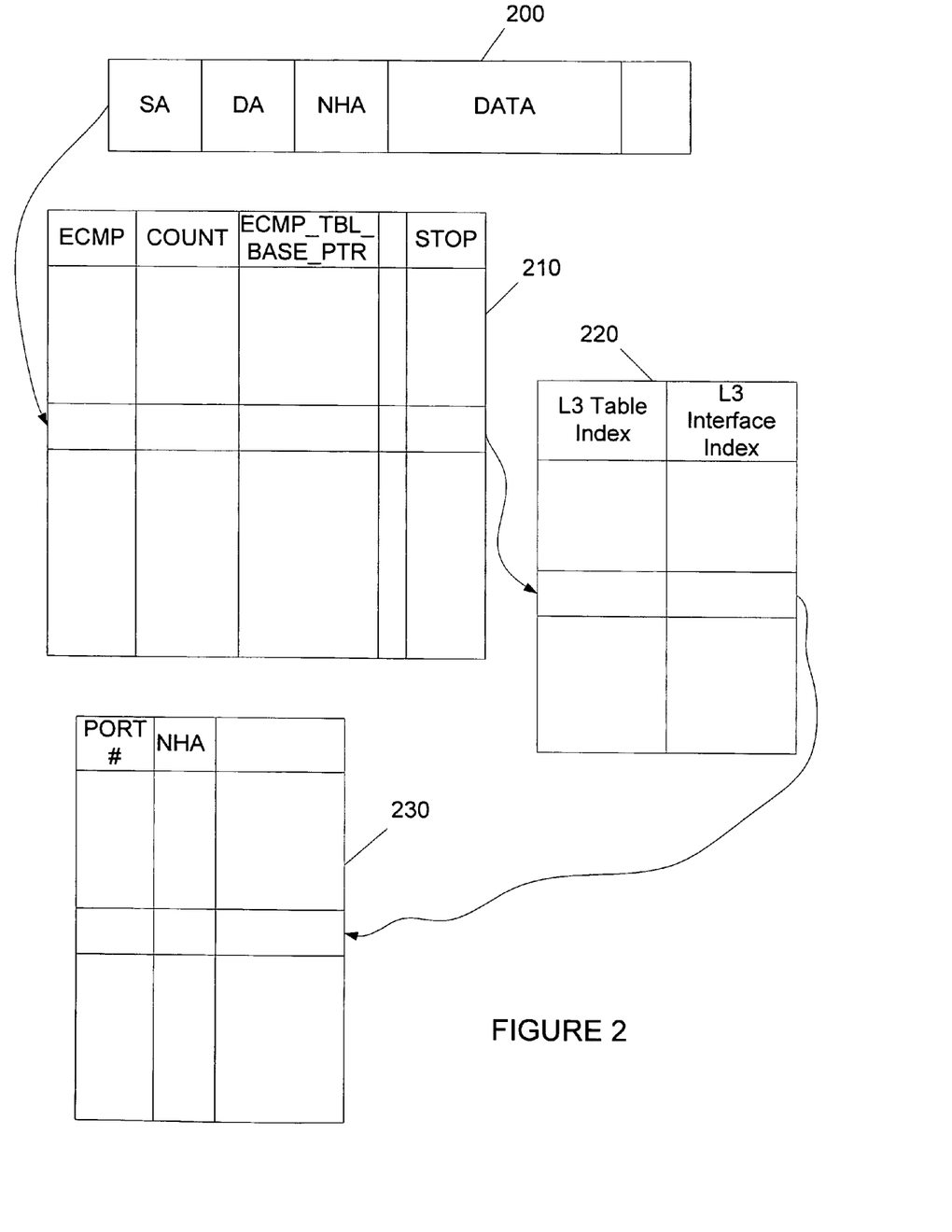
FIG. 2 illustrates a packet, an LPM Table, an ECMP Table, and an L3 Table that may be used according to certain embodiments of the present invention.

According to certain embodiments of the present invention, the device logic 320 includes a first lookup unit 350, which often stores the LPM Table 210 illustrated in FIG. 2. The first lookup unit 350 generally includes an acknowledging unit 360 for acknowledging whether multiple equal-cost paths exist between the distribution device and a location to which a datagram or packet of data is to be forwarded. When an LPM Table 210 is stored in the first lookup unit 350, the acknowledgement unit 360 typically makes use of instructions in the LPM Table 210 to acknowledge whether multiple equal-cost paths are present. In the LPM Table 210 illustrated in FIG. 2, these instructions are typically contained in the column labeled ECMP and commonly take the form of binary ECMP values.

In operation, according to certain embodiments of the present invention, the distribution device or switch 300 performs a Longest Prefix match between the packet 200 and a portion of an entry in the LPM Table 210. Typically, only a single entry in the LPM Table 210 includes a portion that matches the Longest Prefix of the packet 200, regardless of whether or not multiple equal-cost paths exist in the network for the packet 200. This LPM Table 210 entry is referred to below as the "matched entry".

Usually, a distribution device that includes and makes use of a first lookup unit 350 in which an LPM Table 210 is stored relies on the ECMP value included in the matched LPM Table entry to specify whether equal-cost paths exist. Normally, the ECMP value is a binary value that either specifies that multiple equal-cost paths exist or that they do not.

As illustrated in FIG. 2, the LPM Table 210 according to certain embodiments of the present invention also includes an ECMP Table Base Pointer (ECMP_TBL_BASE_PTR), which may be contained or stored within and/or used by a first referencing unit 370, such as the one illustrated as part of the first lookup unit 350 in FIG. 3. Generally, the ECMP Table Base Pointer may be thought of as an instruction, or a part of an instruction, for referencing a second compilation of sets of instructions, which are often contained or stored in the second lookup unit 380 illustrated in FIG. 3. Typically, the ECMP Table Base Pointer is only used when the presence of equal-cost paths has been specified by the ECMP value. In FIG. 2, the second compilation of sets of instructions is represented as the ECMP Table 220, which will be discussed shortly.

The ECMP Table 220 is usually only referenced when multiple equal-cost paths do exist. When the ECMP value in the LPM Table 210 indicates that no equal-cost paths are present, the ECMP Table 220 or, more generally, the second compilation of sets of instructions used by the second lookup unit 380, is normally not referenced. In such cases, instructions for referencing a third compilation of sets of instructions are used.

These instructions for referencing the third compilation of sets of instructions directly from the first compilation of sets of instructions are commonly included in the first compilation of sets of instructions and may, for example, take the form of an L3 Table Index contained in the matched entry of the LPM Table 210. The L3 Table Index may be stored in and/or used by a second referencing unit 365 in the first lookup unit 350.

Typically, the L3 Table Index is used to pick an entry from an L3 Table. The above-discussed ECMP Table may include both the L3 Table Index and the L3 Interface Index. The L3 Interface Index may be used to find the L3 Interface attribute that may eventually be used during datagram transmission but that is not typically relevant to selection from among equal cost paths. This operation is generally simply a direct index from the ECMP Table into the L3 Table at the L3 Table Index address.

As stated above, according to certain embodiments of the present invention, the second compilation of sets of instructions takes the form of the ECMP Table 220 illustrated in FIG. 2 and is commonly stored and/or referenced by the second lookup unit 380. Often, as will be discussed below, the number of sets of instructions in the second compilation is determinative of how a packet is distributed across the set of ports of the distribution device, which act as a set of interface means for interfacing the distribution device with a network, according to a weighted distribution. Usually, the number of sets of instructions is specified by a second distribution unit 375 in the second lookup unit 380. According to certain embodiments, the second distribution unit 375 relies on the COUNT values from the LPM Table 210 to determine how many entries in the ECMP Table 220 correspond to each equal-cost path in the network.

Sets of instructions for referencing the third compilation of sets of instructions are also commonly stored and/or used by a third referencing unit 385 in the second lookup unit 380. These sets of instructions commonly take the form of L3 Table Indices that point to a specific entry in the L3 Table 330. From the discussion above, it should be clear to one of skill in the art that, when multiple equal-cost paths are available, L3 Table Indices from the ECMP Table 220 may be used and that L3 Table Indices from the LPM Table 210 may be used in the absence of multiple equal-cost paths.

In the example illustrated in FIG. 2, one or more identical entries in the ECMP Table 220, each referencing a common entry in the L3 Table 230, may be included. The ECMP Table entries then typically use L3 Table Index values to reference the L3 Table 230.

One advantage of including multiple, identical entries in the ECMP Table 220 is that these multiple entries allow for the distribution of packet traffic across a set of equal-cost paths according to a weighted distribution over time. How such a distribution is achieved is discussed below.

Figure 6:
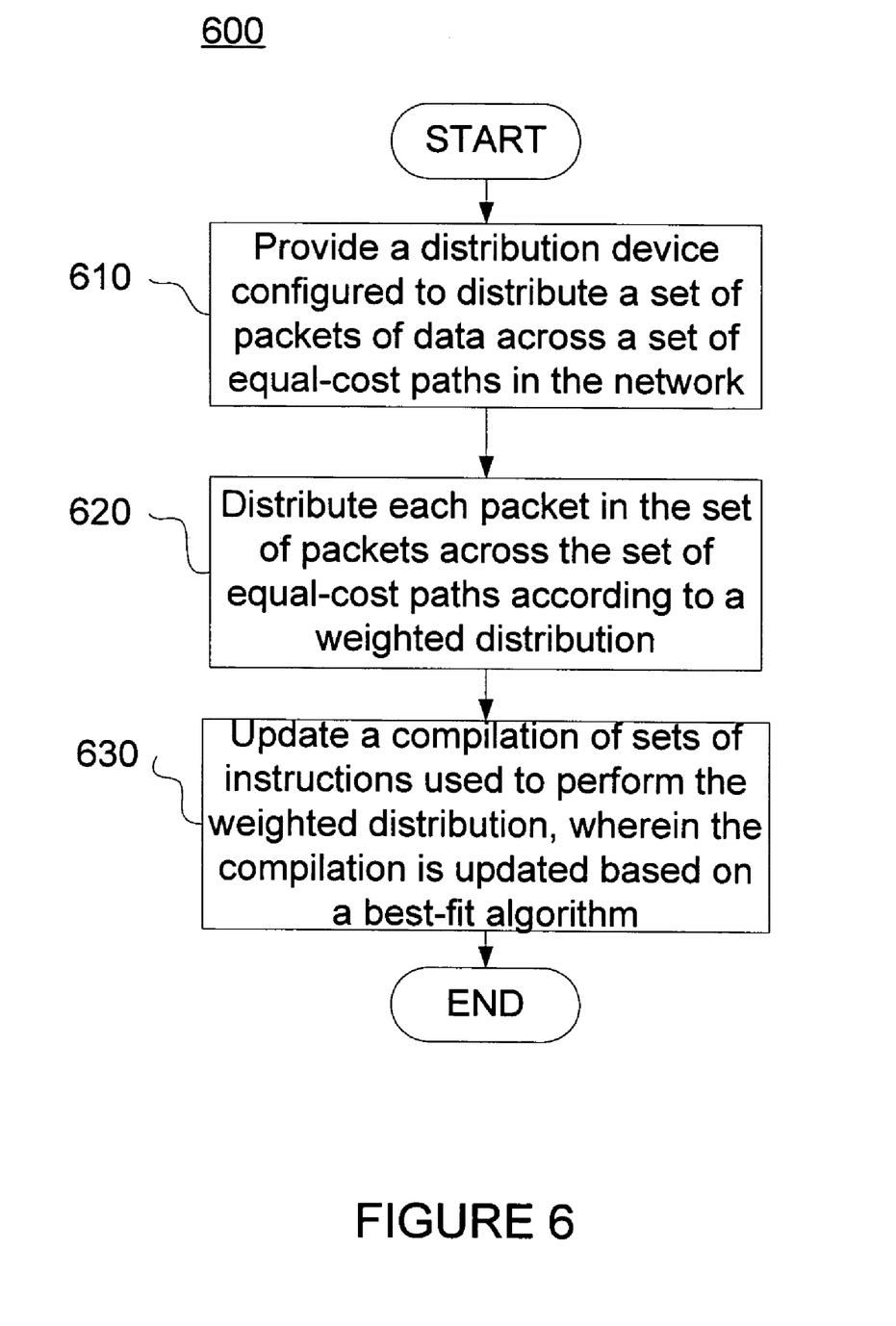
FIG. 6 illustrates the steps of a third representative algorithm that may be used, according to certain embodiments of the present invention, for distributing data across a network.

The distribution of each packet in a set of packets across a set of equal-cost paths according to a weighted distribution is stipulated in the second step 620 of the third representative method 600 illustrated in FIG. 6. The second step 620 generally follows the first step 610 of this third method, wherein a distribution device configured to distribute a set of packets of data across a set of equal-cost paths in a network is provided.

Returning to FIG. 3, it should be noted that the third compilation of sets of instructions discussed above is commonly stored and/or referenced by the third lookup unit 355 and often takes the form of the L3 Table 230 discussed above. More generally, the third compilation typically includes a selection unit 390 that stores and/or references instructions for selecting the egress port of the distribution device through which the datagram or packet is to exit the distribution device. As discussed above, the third lookup unit 355 may be referenced directly from the first lookup unit 350 when no equal-cost paths exist and is generally referenced from the second lookup unit 380 when multiple equal-cost paths do exist.

Returning now to the description of methods that make use of the devices such as the device illustrated in FIG. 3 and that distribute packets based on packet attributes, we note that the packet attributes are usually taken into account when the LPM Table 210 references the ECMP Table 220. In other words, the packet attributes commonly come into play when a set of instructions in the first compilation references the second compilation.

More specifically, according to one representative example, before the ECMP Table Base Pointer is used to reference the ECMP Table 220, the ECMP Table Base Pointer first undergoes a mathematical transformation involving a packet attribute. The mathematical transformation of the ECMP Table Base Pointer may, for example, begin with the selection of a packet attribute, which is often chosen to be the SIP, since different packets passing through the distribution device are more likely to have unique sources and destinations. Then, according to certain embodiments and as shown in the fourth step 540 of the representative method illustrated in FIG. 5, a hashing function is performed on the packet attribute. Among the advantages of performing a hashing function on the packet attribute at this point is that the attribute, which may be relatively lengthy, is reduced to a smaller, yet likely very unique, hash value. Since the smaller hash value can be represented with fewer data bits, the hash value is therefore easier to process than the attribute itself.

Pursuant to the hashing of the packet attribute, the hash value may be mathematically manipulated further, usually by adding the hash value to the ECMP Table Base Pointer to generate a modified pointer into the ECMP Table 220. Because the hash value is, by definition, highly likely to be unique, each modified pointer can reference a different ECMP Table entry or, when multiple identical ECMP Table entries are present, a different set of such identical ECMP Table entries. Since each ECMP Table entry references a single L3 Table entry, each of the packets will be distributed, based on the hashed attribute, over all of the equal-cost paths available, as specified in the fifth step 550 of the method illustrated in FIG. 5.

It should be noted that, according to certain embodiments of the present invention, a user-programmable option may be included to determine a hash selection from the ECMP Table. When such an option is included, a hash of the Layer 3 source address (SIP) and Layer 3 destination address (DIP) are typically used. For example, the following function may be used to select and entry:

Entry_select=[hash_function(SIP,DIP) % size of (ECMP_entries)]

The above function typically concatentates SIP and DIP, both of which may be of 32 bits, to form, for example, a 64-bit quantity. Then, the 64-bit quantity generally has a hash function performed upon it. The results of the hash function may then be used to obtain a modulo result on the divisor, which may be, for example, the number of equal-cost (ECMP) paths available. Since the result will typically have a value between 0 and the number of ECMP paths available, this value may represent the ECMP entry chosen.

When different numbers of identical ECMP Table entries point to a first L3 Table entry and a second L3 Table entry, the above-mentioned weighted distribution of packets among the equal-cost paths becomes possible. For example, if nine identical ECMP Table entries, each pointing to a first L3 Table entry that instructs that the packet be distributed to a first path via a first egress port are present in the ECMP Table 220, and only three identical ECMP Table entries that point to a second L3 Table entry that instructs that the packet be distributed to a second path via a second egress port are present, then the packet is three times as likely to be distributed to the first path than to the second path. Under such circumstances, over time, packet traffic is generally three times higher on the first path than on the second path and the traffic is said to be distributed across the equal-cost paths according to a weighted distribution.

Such a weighted distribution of traffic is especially beneficial when network modules are unevenly loaded with traffic from the rest of the network. For example, in FIG. 3, if the first network device 315 is loaded with more general network traffic than the second network device 325, then the switch 300 may distribute more traffic to the second network device 325 by including more ECMP Table entries in the ECMP Table 220 that point to or reference an L3 Table entry that routes traffic to the second network device 325 than ECMP Table entries that point to an L3 Table entry that routes traffic to the first network device 315.

Another advantage of the above-described method has to do with the fact that, instead of using multiple LPM Table entries to establish the presence of equal-cost paths, an ECMP value is used. Hence, the LPM Table 210 according to certain embodiments of the present invention is typically of a small size. Therefore, the amount of time spent performing lookup algorithms is reduced. Further, because of the small LPM Table, there is generally a reduction in the amount of hardware, such as memory, that is used and/or re-used.

Figure 7:
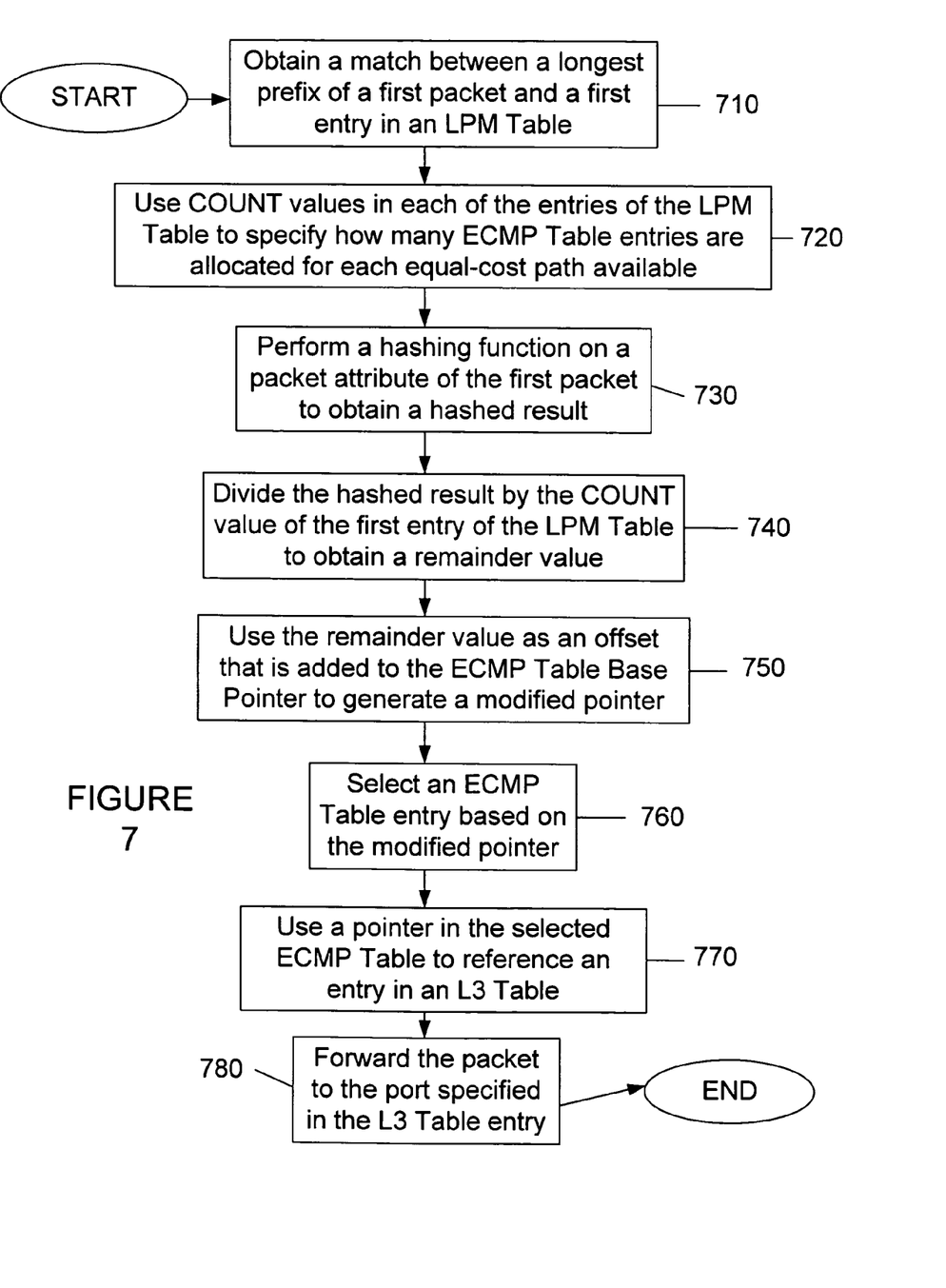
FIG. 7 illustrates the steps of a fourth representative algorithm that may be used, according to certain embodiments of the present invention, for distributing data across a network.

FIG. 7 illustrates the steps of a representative algorithm that is used, according to certain embodiments of the present invention, for distributing data across a network according to a weighted distribution. According to the first step 710 of the algorithm, a match is made between a Longest Prefix of a first IP packet and a first entry in an LPM Table. Then, according to the second step 720, COUNT values, generally found in each of the entries of the LPM Table, are used to specify how many ECMP Table entries are allocated for each equal-cost path available to the packet.

Next, according to the third step 730, a hashing function is performed on a packet attribute of the first packet, thereby obtaining a hashed result. According to the fourth step 740, the hashed result is divided by the COUNT value of the first entry of the LPM Table to obtain a remainder value. Then, according to the fifth step 750, the remainder value is used as an offset that is added to the ECMP Table Base Pointer found in the first entry of the LPM Table to generate a modified pointer.

Following the above-listed steps, sixth step 760 specifies that an ECMP Table entry be selected based on the modified pointer. According to the seventh step 770, a pointer in the selected ECMP Table entry to reference an entry in an L3 Table. According to certain embodiments, the L3 Table Index is used to reference an entry in the L3 Table. Finally, the eighth step 780 specifies that the packet be forwarded to the distribution device egress port specified in the selected L3 Table entry.

If the above-discussed algorithm, or variations thereof, is performed on all packets entering a distribution device pursuant to a determination that the packets have multiple equal-cost paths available to them, then a weighted distribution of traffic over the paths can be obtained. According to certain embodiments of the present invention, as the presence or absence of equal-cost paths varies over time, the various tables used to perform the weighted distribution may be updated. Generally, this may be done according to a best-fit algorithm, as specified in step 630 of FIG. 6, wherein a compilation of sets of instructions used to perform the weighted distribution is updated based on the best-fit algorithm. However, other methods may also be used, including manual alteration by a user.

Figure 8:
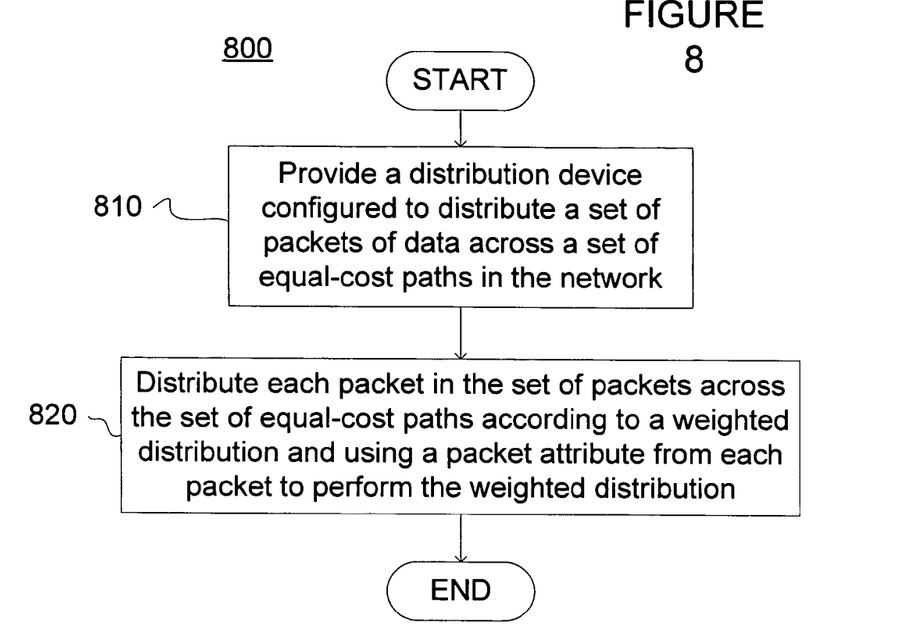
FIG. 8 illustrates the steps of a fifth representative algorithm that may be used, according to certain embodiments of the present invention, for distributing data across a network.

In order to illustrate a fifth representative method 800 according to certain embodiments of the present invention, FIG. 8 is provided. In FIG. 8, the first step 810 specifies that a distribution device configured to distribute a set of packets of data across a set of equal-cost paths in the network be provided. The second step 820 then specifies that each packet in the set of packets be distributed across the set of equal-cost paths according to a weighted distribution. The second step 820 also specifies using a packet attribute from each packet to perform the weighted distribution.

Figure 9:
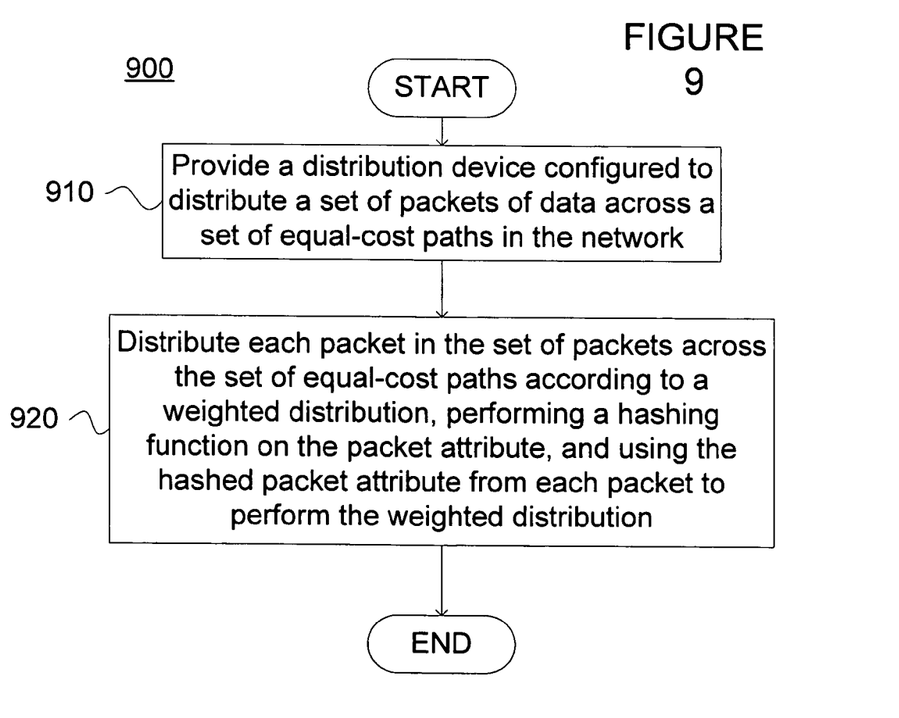
FIG. 9 illustrates the steps of a sixth representative algorithm that may be used, according to certain embodiments of the present invention, for distributing data across a network.

In order to illustrate a sixth representative method 900 according to certain embodiments of the present invention, FIG. 9 is provided. In FIG. 9, the first step 910 specifies providing a distribution device configured to distribute a set of packets of data across a set of equal-cost paths in the network. The second step 920 then specifies distributing each packet in the set of packets across the set of equal-cost paths according to a weighted distribution, performing a hashing function on the packet attribute, and using the hashed packet attribute from each packet to perform the weighted distribution.

Figure 10:
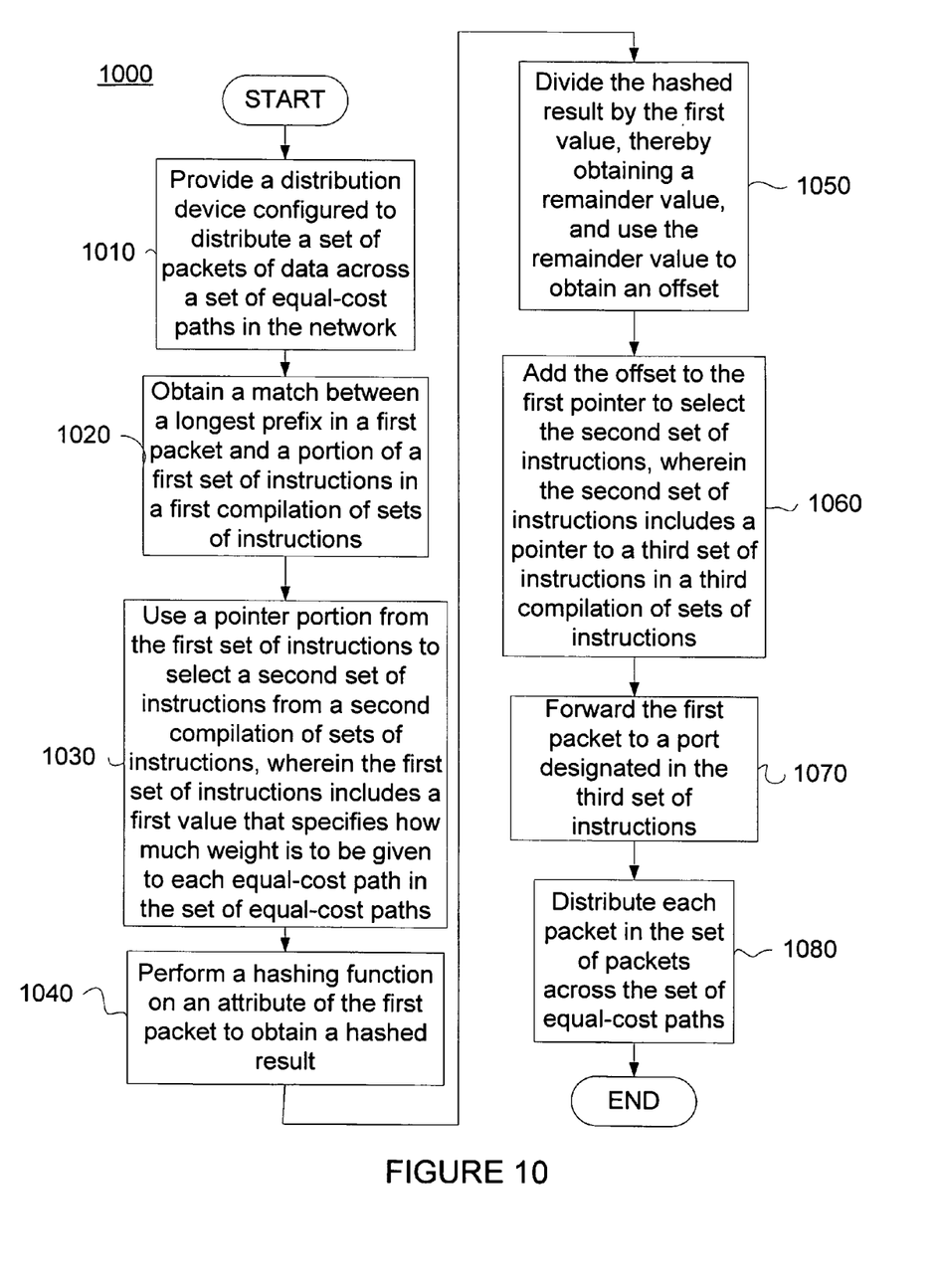
FIG. 10 illustrates the steps of a seventh representative algorithm that may be used, according to certain embodiments of the present invention, for distributing data across a network.

In order to illustrate a seventh representative method 1000 according to certain embodiments of the present invention, FIG. 10 is provided. In FIG. 10, the first step 1010 specifies providing a distribution device configured to distribute a set of packets of data across a set of equal-cost paths in the network. The second step 1020 then specifies obtaining a match between a longest prefix in a first packet and a portion of a first set of instructions in a first compilation of sets of instructions. Then, the third step 1030 specifies using a pointer portion from the first set of instructions to select a second set of instructions from a second compilation of sets of instructions, wherein the first set of instructions includes a first value that specifies how much weight is to be given to each equal-cost path in the set of equal-cost paths.

Following these steps, the fourth step 1040 specifies performing a hashing function on an attribute of the first packet to obtain a hashed result. Then, fifth step 1050 specifies dividing the hashed result by the first value, thereby obtaining a remainder value, and using the remainder value to obtain an offset. Next, sixth step 1060 specifies adding the offset to the first pointer to select the second set of instructions. According to this step, the second set of instructions typically includes a pointer to a third set of instructions in a third compilation of sets of instructions. Following the sixth step 1060, the seventh step 1070 specifies forwarding the first packet to a port designated in the third set of instructions. Finally, the eighth step 1080 specifies distributing each packet in the set of packets across the set of equal-cost paths.

One having ordinary skill in the art will readily understand that the invention, as discussed above, may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of distributing data across a network, the method comprising:
   providing a distribution device configured to distribute packets of data across a set of equal-cost paths in the network;
   determining if a set of equal-cost paths exist; and
   distributing the packets across the paths based on at least one attribute of each of the packets,
   wherein the distributing comprises using a pointer portion from a first set of instructions of a first compilation set of instructions to select a second set of instructions from a second compilation set of instructions, and
   wherein the first set of instructions includes a first value that specifies how much weight is to be given to each equal-cost path in the set of equal-cost paths.

2. The method of claim 1, wherein the distributing comprises distributing the packets based on source addresses.

3. The method of claim 1, wherein the distributing comprises distributing the packets based on next-hop addresses.

4. The method of claim 1, wherein the distributing comprises performing a hashing function on the attribute.

5. A method of distributing data across a network, the method comprising:
   providing a distribution device configured to distribute a set of packets of data across a set of equal-cost paths in the network; and
   distributing each packet in the set of packets across the set of equal-cost paths according to a weighted distribution so that at least one of said packets is given greater weight to be distributed across at least one of said equal-cost paths than at least one other of said equal-cost paths, said packet weight corresponding to a number of entries stored in a memory, wherein the distributing comprises
   obtaining a match between a longest prefix in a first packet and a portion of a first set of instructions in a first compilation of sets of instructions, and
   using a pointer portion from the first set of instructions to select a second set of instructions from a second compilation of sets of instructions, wherein the first set of instructions includes a first value that specifies how much weight is to be given to each equal-cost path in the set of equal-cost paths.

6. The method of claim 5, wherein the distributing further comprises using a packet attribute from each packet to perform the weighted distribution.

7. The method of claim 6, wherein the distributing comprises performing a hashing function on the packet attribute.

8. The method of claim 5, wherein the distributing comprises:

performing a hashing function on an attribute of the first packet to obtain a hashed result;

dividing the hashed result by the first value, thereby obtaining a remainder value, and using the remainder value to obtain an offset;

adding the offset to the first pointer to select the second set of instructions, wherein the second set of instructions includes a pointer to a third set of instructions in a third compilation of sets of instructions.

9. The method of claim 8, wherein the distributing further comprises forwarding the first packet to a port designated in the third set of instructions.

10. The method of claim 5, further comprising updating a compilation of sets of instructions used to perform the weighted distribution, wherein the compilation is updated based on a best-fit algorithm.

11. A distribution device, the device comprising:

a set of ports; and a first distribution unit, including a device logic, wherein the first distribution unit is configured to use the device logic to distribute a packet of data entering the device through a first port among the set of ports to a second port among the set of ports, the device logic comprising:

a first lookup unit including an acknowledgement unit for acknowledging whether multiple equal-cost paths exist, a first referencing unit for referencing a second lookup unit when multiple equal-cost paths do exist, and a second referencing unit for referencing a third lookup unit otherwise, the second lookup unit including a second distribution unit for distributing the packet across the set of ports and a third referencing unit for referencing the third lookup unit, and the third lookup unit including a selection unit for selecting the second port.

12. The device of claim 11, wherein, in the second lookup unit, multiple entries, each referencing a common set of instructions in the third lookup unit, are included.

13. The device of claim 12, wherein, in the second lookup unit, a different number of entries resulting in the packet being distributed to the first path than to a second path are included.

* * * * *

UNITED STATES PATENT AND TRADEMARK OFFICE
CERTIFICATE OF CORRECTION

PATENT NO. : 7,606,161 B2 Page 1 of 1
APPLICATION NO. : 10/825656
DATED : October 20, 2009
INVENTOR(S) : Kalkunte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

PATENT NO.       : 7,606,161 B2                                         Page 1 of 1
APPLICATION NO. : 10/825656
DATED            : October 20, 2009
INVENTOR(S)      : Mohan Kalkunte et al.

It is certified that error appears in the above-identified patent and that said Letters Patent is hereby corrected as shown below:

In column 1, line 10, delete "60/592,617," and insert -- 60/529,617, --, therefor.

Signed and Sealed this

Twenty-third Day of November, 2010

David J. Kappos
*Director of the United States Patent and Trademark Office*